United States Patent [19]
Bernitz et al.

[11] Patent Number: 4,792,887
[45] Date of Patent: Dec. 20, 1988

[54] REGULATED RECTIFIER D.C. POWER SUPPLY

[75] Inventors: Franz Bernitz, Unterhaching; Eugen Statnic, Munich; Frank Hansmann, Münder, all of Fed. Rep. of Germany

[73] Assignee: Patent-Treuhand-Gesellschaft, Munich, Fed. Rep. of Germany

[21] Appl. No.: 84,466

[22] Filed: Aug. 10, 1987

[30] Foreign Application Priority Data

Aug. 13, 1986 [DE] Fed. Rep. of Germany ....... 3627395

[51] Int. Cl.⁴ .......................................... H02M 3/156
[52] U.S. Cl. ..................................... 363/89; 323/222; 323/287
[58] Field of Search ................ 323/222, 285, 286, 287; 363/89

[56] References Cited

U.S. PATENT DOCUMENTS 3,585,491 6/1971 Peterson .......................... 323/286 X
4,712,169 12/1987 Albach ............................ 323/222 X

FOREIGN PATENT DOCUMENTS 2091915 8/1982 United Kingdom ................ 323/222

OTHER PUBLICATIONS

"Siemens Components 24", Issue 1, 1986, pp. 9–13, 30.

Primary Examiner—Patrick R. Salce
Assistant Examiner—Kristine Peckman
Attorney, Agent, or Firm—Frishauf, Holtz, Goodman & Woodward

[57] ABSTRACT

A control circuit for controlling a known active harmonic filter operating as a step-up converter in a power supply with sinusoidal network current input and a power factor of almost unity. The step-up converter comprises: a main rectifier, a storage inductance ($L_S$), a cross-connected high-speed transistor ($T_Q$), a diode (D1) and a power storage capacitor ($C_L$). The high-speed transistor ($T_Q$) is controlled by a first threshold switch (STc) whose input is controlled by a control capacitor (C12) coupled to receive a signal representative of instantaneous rectified d.c. output voltage ($U_E$), instantaneous power output voltage ($U_o$) and a signal representative of the charge state of the inductance. The inductance charge signal is obtained from a voltage jump (ringing voltage) between the inductance and the diode (D1) by sensing a flank of an oscillation voltage occurring at the diode by a RC circuit (R8, C10), which triggers a second threshold switch (STa) to control charge reversal and recharge of the capacitor (C12), thus determining the time instants of operation of the first threshold switch to control the cross-connected electronic switch ($T_Q$) to conduction, and hence restoring of electrical energy in the inductance.

21 Claims, 3 Drawing Sheets

REGULATED RECTIFIER D.C. POWER SUPPLY

The present invention relates to a regulated d.c. power supply network, adapted for connection to a commercial alternating current network supply, for example of the 110 or 220 V, 60 or 50 Hz type, to provide a regulated d.c. output voltage, and especially to such a power supply which includes a harmonic filter, so that the power supply as connected to an a.c. network will, in effect, form a load which does not distort the wave shape of the a.c power being supplied, and has a power factor of almost unity.

BACKGROUND

The referenced Publication "Siemens Components 24", Issue 1, 1986, pp. 9-13,30, describes an active harmonic filter for use in network power rectifier circuits. Active harmonic filters permit connection to a power network so that the current accepted from the power network will be essentially sinusoidal, with a power factor of almost or approximately unity. The d.c. output voltage should be capable of being regulated.

The harmonic filter, as described, basically includes a network rectifier with an input radio interference suppression filter. The rectifier circuit is connected downstream of the interference suppression filter. It operates as a step-up circuit with low input capacitance.

Basically, the active harmonic filter includes an inductance connected between the output of a rectifier, for example a typical bridge rectifier, and d.c. output terminals of the power supply. A power storage capacitor is connected across the output terminals, in well-known fashion, and a diode is interposed between the connection from the inductance, for example a choke, to the respective d.c. output terminal. A controlled electronic switch, typically a transistor, is connected between the diode—inductance connection junction—and the other d.c. output terminal of the power supply. A control circuit is connected to the transistor which so controls conduction of the transistor that the input current taken by the overall circuit from the a.c. power network is as sinusoidal as possible, while providing at the output an output voltage and current which is regulated, independently of voltage variations of input voltage and essentially ripple-free. To do so, the inductance or choke must not have any gaps in current flowing therethrough, since, otherwise, the current accepted from the power network would no longer be sinusoidal. This requires switching of the conduction state of the cross-connected transistor only when the choke or inductance is discharged, that is, no longer stores any electromagnetic energy.

The charge state of the inductance can be sensed by winding the inductance with a secondary winding or sensing winding. If the cross-connected transistor is connected when the choke is discharged, and with constant turn-on-time, a network current will result which is proportional to network voltage, that is, under normal loading condition will be sinusoidal. The output voltage, or output current or power, respectively, can be controlled by controlling the connection period or duration of the transistor, and thus the electromagnetic storage time or charge time for the inductance. The off-time duration of the transistor is determined by the time to permit the inductance to discharge.

The on-time $t_1$ of the transistor, in the circuit described in the referenced publication, is controlled by a comparatively complex circuit which receives information regarding the instantaneous input voltage $U_E$ to the control circuit, derived from the output of the rectifier, and the instantaneous output voltage $U_o$ from the power supply, as well as a signal representative of the instantaneous current flowing through the transistor. The secondary winding of the choke provides a signal which is indicative of complete discharge of the electromagnetic energy charged in the choke. The circuit includes control amplifiers, comparators comparing the instantaneous output voltage with a command output voltage, a multiplier which receives the output difference value of a first control amplifier and the instantaneous input voltage, a second control amplifier which compares the actual current with a command current through the transistor, and which provides an output signal to control a driver stage. The driver stage includes an amplifier, a bistable flipflop circuit and connecting elements. While the control circuit works well, it requires a substantial number of components and is comparatieely complex. It has been found that the exact instant of time of discharge of the inductance can be sensed by the secondary winding only with great difficulty, so that controlling the cross-connected transistor to conduction is not precisely determined. If the cross-connected transistor is controlled to conduction too early, a short-circuit current from the output capacitor may flow through the transistor due to the reverse recovery period of the serially connected diode. This current may reach a dangerous level, damaging or even destroying the transistor and/or the diode, while, further, reducing the efficiency of the step-up circuit. Additionally if the OFF time of the transistor is longer than the discharge period of the choke, to reliably prevent any short-circuit currents, undesired oscillations may occur based on the leakage inductance of the choke and parasitic capacities of the transistor which, again, reduce the efficiency of the circuit network. Further, undesired current gaps may occur which distort the pure sine wave of current being supplied to the power supply.

THE INVENTION

It is an object to improve the control circuit used in a power supply unit or network which is simpler than the circuits heretofore proposed, and has improved reliability and operating effectiveness.

Briefly, the control circuit for a control transistor in the network as described, typically cross-connected, includes a first threshold switch or threshold circuit connected to and controlling the conduction of the electronic switch. A control capacitor is coupled to receive a signal representative of the instantaneous value of a pulsating rectified d.c. output voltage supplied by the rectifier which is connected through an inductance to a load. The capacitor is also coupled, to and receives a signal representative of the instantaneous output d.c. voltage actually supplied to a load. The capacitor is further coupled to receive a signal representative of the charge state of the inductance, without requiring, however, an inductance sensing winding. The capacitor is connected to control the threshold switch to render the electronic controlled switch conductive for a period of time which corresponds to the charge reversal and recharge time of the control capacitor. The control capacitor will, upon recharging reach a threshold level of the threshold switch. The threshold switch has hysteresis. The charge reversal and recharge time, in accordance with a feature of the invention, is determined by the relative values of the signals representative of the rectified d.c. output voltage supplied by the rectifier, the output d.c. voltage supplied by the power supply unit as a whole, and the time when the upper hysteresis threshold level is reached is determined by the time instant when the signal representative of the charge state of the inductance has a characteristic which signifies that the inductance has been completely discharged. This latter signal, having this characteristic, can be derived based on sensing the voltage ahead of the inductance and downstream of the inductance, that is, sensing the voltage across the inductance which, upon complete discharge of the inductance, will cause a voltage jump (ringing voltage), or sharp difference sensed by a R/C timing circuit. This voltage jump can be applied to a second threshold switch which, in turn, is applied to the capacitor controlling the first threshold switch. The timing instant, thus, can be accurately determined by connecting a junction point ahead and behind the inductance—in the sense of power flow through the inductance to the output terminals of the power supply, and sensing the voltage at the junction between the inductance and the diode, that is downstream of the inductance which, in turn, is applied to the R/C circuit.

The arrangement has the advantage that the transistor can easily be controlled by a precise direct sensing of the voltage condition of the junction between the inductance and the diode, so that optimum switching of the transistor to ON condition can be easily and reliably determined.

DRAWINGS

Figure 1:
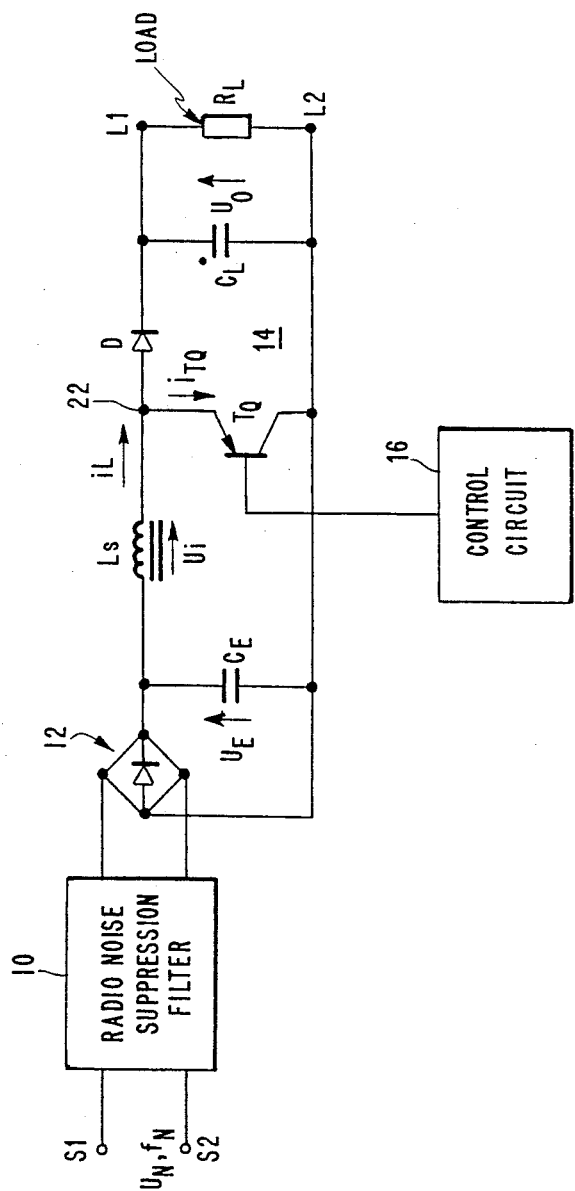
FIG. 1 is a power supply network using a dynamic or active harmonic filter.

FIG. 1 illustrates the circuit diagram, in general principle, of a power supply with an active, or dynamic harmonic filter. The circuit has two source input terminals S1,S2, connected for example to a power network having input voltage $U_N$, of a frequency $f_N$, for example 50 or 60 Hz. The input power terminals are connected to a radio noise suppression filter 10 which, in turn, is connected to a standard rectifier 12, for example a semiconductor bridge rectifier. The output voltage $U_E$ of the bridge rectifier 12 is applied to a small input capacitor $C_E$ of the harmonic filter network. One terminal, for example the negative terminal of the capacitor $C_E$, is connected to the load output terminal L2 of the harmonic filter. The load, connected across both output terminals L1, L2 is schematically shown as a load resistor $R_L$.

The capacitor $C_E$ has its other terminal connected through a choke or inductance $L_S$ through which a current $i_L$ flows. This current is a saw-tooth current.

Downstream, with respect to power flow, of the inductance $L_S$, is a junction 22 which is connected to a diode D and to the drain or collector of a transistor $T_Q$. The diode D is connected with the cathode terminal to the load capacitor $C_L$, the other terminal of which is connected to the output terminal L2. The first terminal capacitor of the $C_L$, forming the junction with the diode, is connected to the output load terminal L1. The output voltage across terminals L1,L2 is shown at $U_o$. The transistor $T_Q$ bridges the portion of the circuit downstream of the choke $L_S$. The transistor $T_Q$ is controlled between conduction and cut-off by control circuit 16. The circuit is known and operates as a step-up circuit, in which the minimum d.c. output voltage $U_o$ is slightly above the peak value of the input network voltage $U_N$.

The control circuit 16 is provided to so control the transistor $T_Q$ that at the input side, the current accepted by the network is as sinusoidal as possible, while at the output the output voltage $U_o$, or the output current $I_o$ and, respectively, the output power $P_o$, are independent of network and load variations, that is, provide a regulated output voltage and power. No current gaps may occur in the current $i_L$ flowing through the inductance $L_S$ since, otherwise, the network current taken at terminals S1,S2 would no longer be sinusoidal.

Figure 2:
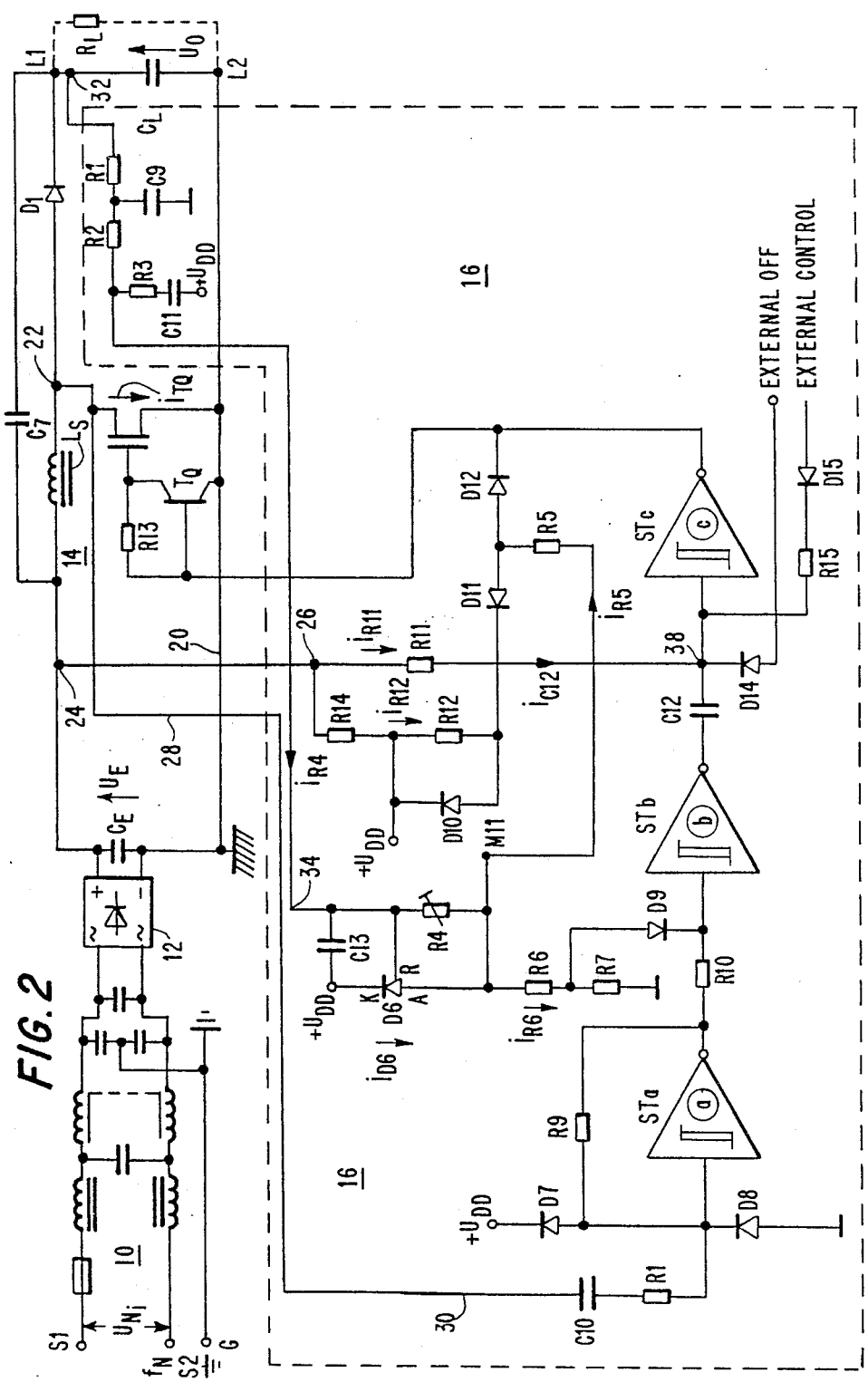
FIG. 2 is a detailed circuit diagram of the harmonic filter using the control circuit in accordance with the present invention.

FIG. 2 illustrates the network and system of the present invention, and again the radio suppression filter 10, which can be constructed in any suitable and well-known manner. The power supply is shown as a three-wire power supply, with a separate ground terminal G to insure the radio frequency noise suppression. The circuit 14, forming the step-up circuit, including the transistor $T_Q$, the inductance $L_S$ and the diode $D_1$, as well as the load capacitor $C_L$, are the same as in the circuit of FIG. 1. The present invention is specifically directed to the control circuit 16 and its operation as well as connection to the network 14.

The radio noise suppression filter 10 and rectifier 12 can be constructed in accordance with any well-known and suitable manner, and need not be described in detail. The input capacitor $C_E$ is of comparatively low value. Rectified input voltage $U_E$ in the form of positive sine half-waves appear across the capacitor $C_E$. The negative terminal of capacitor $C_E$ is connected to the negative terminal L2 via ground or common bus 20. The upper terminal of capacitor $C_E$ is connected to the input terminal of the inductance $L_S$ which, in turn, is serially connected through diode $D_1$ to the positive load output terminal L1, for connection to a load shown schematically as $R_L$ in broken line form. The load capacitor $C_L$ is an electrolytic capacitor having substantially higher capacity than the input capacitor $C_E$. The regulated output voltage $U_o$ will appear across the capacitor $C_L$, used to feed the load $R_L$. A typical application for the rectifier network is, for example, a supply network for HID or fluorescent lamps, although it may be used with other types of loads, for example, with television apparatus or the like.

The controlled current path of the transistor $T_Q$ is cross-connected between junction 22 of the choke $L_S$ with the diode D1, and with the ground or common bus 20. The control input of the transistor $T_Q$, which may be a MOS-FET or Darlington transistor, including a field effect section, receives a control input signal via a coupling resistor R13 which feeds the output signal from the control circuit 16 to the transistor $T_Q$. The instantaneous input voltage $U_E$ is connected to the control circuit 16 by a junction 24 between the positive terminal of input capacitor $C_E$ and the input terminal of the inductance $L_S$, and connected to a junction terminal 26 of the control circuit 16. A connection line 28 connects the junction 22 to an input terminal or line 30 in the control circuit 16.

The output voltage $U_o$ is taken from a junction 32 between the diode $D_1$ and the capacitor $C_L$, and coupled via serially connected resistors R1 and R2 to an input terminal 34 of the control circuit 16.

Control circuit 16 includes, as its most important component, a Schmitt trigger STc, operating as a threshold switch, to control conduction (ON state) or blocking (OFF state) of the transistor $T_Q$. The trigger STc thus controls the ON time duration of the transistor $T_Q$, and with it the charge or electromagnetic storage time of the inductance $L_S$, in dependence on the charge state of a capacitor C12 connected to the input of the threshold switch STc. The ON time duration of the transistor $T_Q$ is directly determined by the charge and-/or recharge time of the capacitor C12 to reach the upper hysteresis threshold level of the trigger STc. The charge, charge reversal and recharge time of the capacitor C12 is determined by the current $iC_{12}$ which, in turn, is determined by three factors:

(a) The current $i_{R12}$ flowing through the resistor R12. Resistor R12 is connected to a positive reference voltage $+U_{DD}$, for example of 12 V. The second terminal of the resistor R12 is connected to a junction 38 between one terminal of the capacitor C12 and the input of the trigger STc. The basic $i_{R12}$ current would cause the capacitor C12 to be recharged at a constant time, and would thus lead to a constant ON time of the transistor $T_Q$;

(b) A current $i_{R11}$ flowing through a resistor R11 which is connected to junction 24 and the junction 38. This current is proportional to the instantaneous input voltage $U_E$ which depends on the instantaneous network voltage $U_N$. This current is added to the current $i_{R12}$ through the resistor R12. At rising instantaneous input voltage $U_E$, the charge reversal and recharge time of the capacitor C12 is decreased;

(c) A current $i_{R4}$ which is caused by the voltage $U_o$ tapped off junction 32 and coupled to resistor R4 over resistors R1, and R2. The current $i_{R4}$ causes a voltage drop across resistor R4 which is used to control the controlled diode $D_6$. Current $i_{R6}$ and current $i_{R5}$ will thus change. This decreases the charge reversal and recharge time of the capacitor C12 in dependence on the instantaneous output voltage $U_o$, by decreasing the recharging time, to thereby control the level of the output voltage $U_o$. The resistor R4 is preferably variable, and permits base setting of the output voltage $U_o$.

A maximum ON time $t_{1max}$ is obtained when the instantaneous input voltage $U_E$ drops towards zero or null. This time determines the lowest operating frequency of the step-up circuit. The resistor R12 has a resistance which is proportional to the ON time $t_1$. The lowest operating frequency should not be within humanly perceptible audible range.

The current $i_{R11}$, flowing through resistor R11, changes the ON time $t_1$ governed by the current $i_{R12}$, in dependence on the instantaneous input voltage $U_E$ to reduce the ON time $t_1$. The input voltage $U_E$, of course, is also proportional to the instantaneous network voltage $U_N$. If the influence of the current $i_{R11}$ is small, that is, with a relatively high resistance value of R11, the network current will be approximately sinusoidal. With intermediate influence, the network current wave shape will be roughly semi-circular, which increases the transition upon zero-crossing of the network voltage. If the current $i_{R11}$ has a substantial effect, tthe network curent will be approximately trapezoidal. If network current is essentially semi-circular, or trapezoidal, the maximum current through the transistor $T_Q$ or the diode $D_1$, respectively, will be lower, resulting in lower losses. An additional advantage is the lower hum voltage at the output terminals L1,L2 of the step-up circuit 14.

Input 34 to the control circuit 16 has the output voltage $U_o$ applied thereto. A reference voltage circuit is also connected to the terminal 34. The reference voltage circuit includes a controlled Zener diode D6, the cathode of which is connected to the reference voltage $+U_{DD}$, whereas the anode thereof is connected to the resistor R5 and to a voltage divider formed by resistors R6,R7. The free terminal of resistor R7 is connected to ground. The anode of the Zener diode D6 is connected through variable resistor R4 to the input 34 of the control circuit 16, as described. A capacitor C13 is connected between terminal 34 and the cathode of the Zener diode D6 and the reference potential $+U_{DD}$. The junction between the resistor R4 and the capacitor C13, or, respectively, the terminal 34, is connected to the control input R of the controlled Zener diode D6.

Let it be assumed that the output voltage $U_o$ rises. The voltage between the anode and the control input R will likewise rise, so that the current $i_{D6}$ through the diode D6 will increase which, via resistor R5 and diode D11 decreases the charge time of the capacitor C12. This decreases the charge time $t_1$ of the inductance $L_S$. The output voltage $U_o$ is regulated to its command value. The resistance value of resistor R4 can be changed so that the command or regulated output voltage $U_o$ can be set for differen selected values.

The instant of time at which charge of the inductance $L_S$ has to start, after having been completely discharged, is of substantial importance for proper operation of the network in accordance with the present invention. This time period is governed by the instant that transistor $T_Q$ becomes conductive. As described, it is previously necessary that the inductance $L_S$ is completely discharged, and the reverse recovery period of diode $D_1$, after the inductance $L_S$ has terminated discharging, has ceased.

In accordance with a feature of the invention, the voltage at the junction 22 between the inductance $L_S$ and the diode $D_1$ is sensed and connected to the input 30 of the control circuit 16. The input 30 is connected to an input R/C network formed by capacitor C10 and resistor R8. Upon termination of discharge of the choke $L_S$, and after complete blocking of the diode $D_1$, a voltage jump from the value $U_o$, to zero or null occurs at the junction 22 which, by the R/C element formed by resistor R8 and capacitor C10, is applied to the second Schmitt trigger STa, and then through a third Schmitt trigger STb, for immediately controlling the transistor $T_Q$ to conduction by triggering the first Schmitt trigger $ST_c$. The choke $L_S$ is charged for a period of time until the voltage at junction 38, due to charge of the capacitor C12, has reached again the upper hysteresis threshold level of the first Schmitt trigger STc, so that the Schmitt trigger changes state, causing transiator $T_Q$ to block.

To reach starting conditions upon connecting the circuit, the control circuit 16 utilizes the second Schmitt trigger STa, the input of which is connected to the free terminal of the resistor R8, and which, further, is clamped by diodes D7 and D8 with respect to input voltage between ground or common and the reference voltage $+U_{DD}$. This clamps the voltage jump at the resistor R8, at high input voltage, to a value which prevents destruction of the Schmitt trigger STa. The output of the Schmitt trigger STa is connected over a feedback circuit to the input of the Schmitt trigger STa by a resistor R9. The output of the Schmitt trigger STa is connected through a coupling resistor R10 with the input of the third Schmitt trigger STb. Schmitt trigger STb operates as an inverter, and its output is connected to one terminal of the capacitor C12. The input of the Schmitt trigger STb is further connected via diode D9 with the junction or tap of the voltage divider R6 and R7.

Diode D12 connects the junction between resistor R5 and diode 11 to the output of the threshold switch STc.

It may occur that, at high network voltages $U_N$, the instantaneous value of the input voltage $U_E$ approaches the output voltage $U_o$. Capacitor C7, which is connected across the choke $L_S$ and diode $D_1$ transfers additional energy from the input capacitor $C_E$ to the output capacitor $C_L$.

Resistors R1 and R2, together with capacitor C9 which has its other terminal connected to ground or common, form a T circuit. The open connection of resistor R2 is connected over a resistor R3 and a serially connected capacitor 11 to the positive reference voltage $+U_{DD}$. This R/C combination eliminates hum portions from the control current $i_{R4}$ through the variable resistor R4 and additionally, prevents any tendency of the system to oscillate. The hum portions are second harmonics of the power network frequency, that is, 100, or 120 Hz, respectively. C11 is placed on reference potential $U_{DD}$ so that, upon starting, the current $i_{R4}$ is as high as possible, so that the start will be soft or gradual, to permit slow build-up of the output voltage $U_o$ at the output capacitor $C_L$.

A resistor R14 is connected to the junction 26 and to the positive reference voltage $+U_{DD}$. A diode D10 is connected in parallel to the resistor R12. An external turn-off signal can be coupled through a diode D14 to junction 38 at the input of the threshold circuit STc. External control of the circuit is also possible by the serially connected network of diode D15 and resistor R15, likewise connected to junction 38.

Figure 3A:
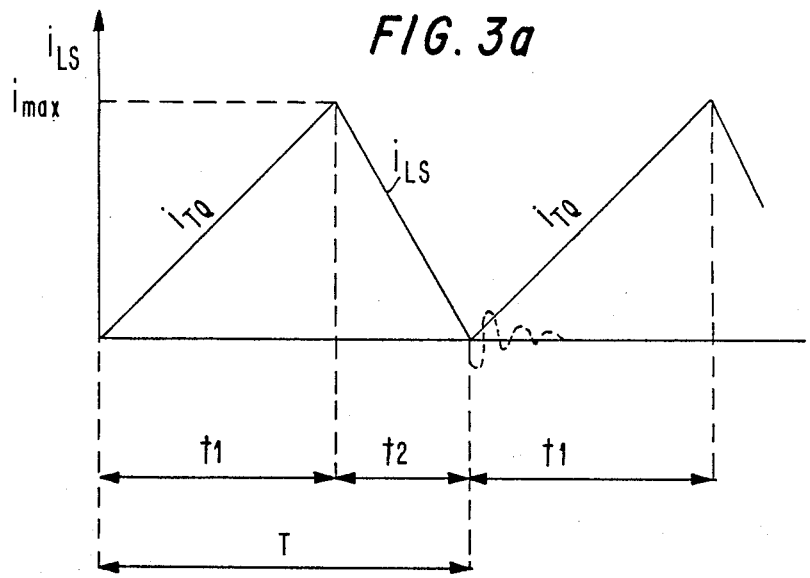
FIGS. 3a and 3b are wave shapes used in explanation of the operation of the circuit in accordance with the present invention.
Figure 3B:
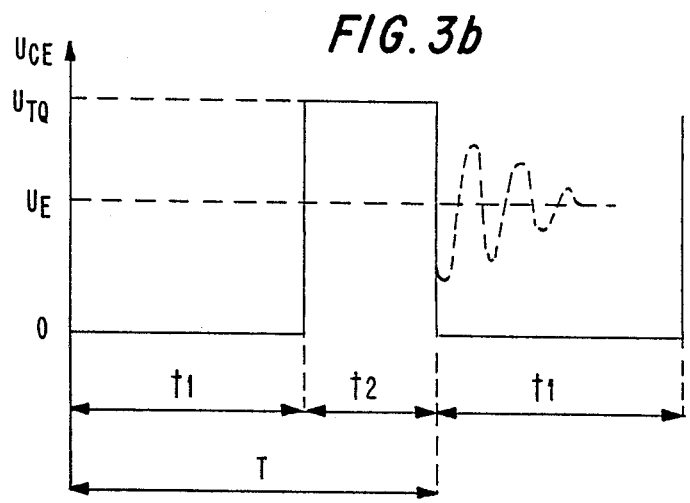

OPERATION, WITH REFERENCE TO FIGS. 3a and 3b:

FIG. 3a shows respective currents and FIG. 3b shows respective voltages. The figures are drawn in vertical alignment.

Upon connecting the filter in accordance with FIG. 2 to a network source at terminals S1 and S2, current will flow through the radio noise suppression filter 10 and rectifier 12 to result in a voltage $U_E$ across the input capacitor $C_E$ to be applied to the step-up circuit 14. The voltage $U_E$ will have positive sine halfwaves. The linearly rising current results in storage of energy in the choke $L_S$. The charge time $t_1$ is controlled by the control circuit 16. Let it be assumed that transistor $T_Q$ is blocked. The choke $L_S$ can discharge through diode $D_1$, to charge the capacitor $C_L$, so that an output voltage $U_o$ will build up across the terminals L1,L2.

As has been referred to above, it is necessary to determine the discharge state of the choke $L_S$. The charge, or, rather, discharge state of the choke $L_S$ is sensed via the R/C circuit R8,C10, forming a timing circuit. As soon as the current through diode D1 drops to zero, the voltage at the junction 22 likewise will go to zero from the value $U_o$. This change in voltage is representative of the charge state of the choke $L_S$, and is termed an "L" signal. The choke $L_S$ now tries, by means of parasitic capacity, to initiate a damped oscillation (voltage ringing). This damped oscillation is sensed by the timing circuit R8, C10. The first falling or dropping flank of the oscillation is applied to the input of the second trigger circuit STa, due to the clamping by the diodes D7 and D8 by the positive reference voltage $+U_{DD}$. The input of the second trigger circuit Sta is thus switched to a logic 0. The output of the trigger STa thus becomes a logic 1 and controls, via resistor R10, the input of the third trigger circuit STb to become a logic 1. The output of the circuit STb thus will change from logic 1 to logic 0. This change is transferred over capacitor C12 to the input of the first trigger circuit STc, operating as a threshold switch. The output of trigger STc will jump to logic 1, causing the transistor $T_Q$ to change to conductive state, that is, to be connected ON. This permits the choke $L_S$ to charge again, linearly. Current $i_{TQ}$ through the transistor $T_Q$ after the time $t_1$ will reach a value $$i_{max} = \frac{U_E \times t_1}{L_S}. \tag{1}$$

As clearly seen, the maximum current depends on the instantaneous input voltage $U_E$ and on the charge time of the choke $L_S$ or, respectively, the connection time or ON time $t_1$ of the transistor $T_Q$.

The inherent delay through each one of the triggers STb,STc is about 50 ns, if these triggers are constructed in complementary MOS technology. The overall course time delay of 150 ns is far below 1 microsecond, with respect to a minimum ON connection time $t_1$ min. If Schmitt triggers are made in accordance with H-CMOS technology, the delay for each component is about 10 ns.

The conduction time of the transistor $T_Q$, and hence the charge time of the inductance $L_S$, is directly determined by the charge reversal and recharge time of the capacitor C12, applied to the upper hysteresis threshold voltage of the Schmitt trigger STc. The capacitor C12 is discharged when the output of the third trigger STb has a logic 1 thereon. The charge time $t_1$ has a maximum value when the input voltage $U_E$ approaches 0 and is reduced when the input voltage $U_E$ increases and when the output voltage $U_o$ is above a command or desired level.

After the duration of the ON time $t_1$ has terminated, that is, after the first trigger STc has changed state, and the transistor $T_Q$ blocks, the choke $L_S$ can discharge through diode $D_1$ during a discharge time duration $t_2$. At the end of time $t_2$, the discharge state of the choke $L_S$ is determined and a new charge cycle can be initiated. Thus, a freely oscillating circuit is provided, in which the frequency of oscillation is dependent on the time $T = t_1 + t_2$, for example between 20 and 100 kHz.

FIGS. 3a and 3b show the course of the oscillation. FIG. 3a shows the current through the transistor $T_Q$ to charge the choke $L_S$, and the discharge current through the diode $D_1$; FIG. 3b shows the voltage $U_{TQ}$ across the transistor $T_Q$ or, in other words, at the junction 22.

The damped oscillation shown in the figures in broken lines would oscillate at the instant of discharge of the choke $L_S$ and of the diode $D_1$ above the instantaneous value of the rectified voltage $U_E$. However, and in accordance with a feature of the invention, the first flank of this oscillation is sensed and applied to the input of the second trigger STa, and is used to change the condition of the control circuit, by, in turn, controlling conduction of the transistor $T_Q$ based on change of state of the first trigger STc.

The charge reversal and recharging of the capacitor C12 and the consequent change of state of the output of the Schmitt trigger STb might cause excess voltage at the Schmitt trigger STc of about 5 V, causing a voltage of $U_{DD}+5$ V. However, this voltage is clamped by the diode D10. If the circuit is constructed as an integrated circuit, having an internal protective circuitry, the diode D10 need not be used, for example using a Hex Schmitt trigger 40106. The diode D10 further ensures that upon rapid sequencing of pulses, the output of the first trigger STc can immediately switch back to a "1", for example when the choke $L_S$ at low network voltage is immediately charged again.

Excessive rise of the output voltage $U_o$ is limited by deactivating the first trigger STc, so that the choke $L_S$ will not charge as long as excess voltage conditions pertain. Specifically, the Zener diode D6 is used, among other purposes, as an over-voltage protection: upon rising current $i_{D6}$ through the Zener diode, the voltage at the junction of the resistors R6 and R7 rises so that through diode D9 the level of Stb rises, too. In this situation, the voltage level at the input to Stb can no longer fall below the lower hysterisis threshold voltage. The output of the third Schmitt trigger STb thus remains at the state of logic 1 as long as the output voltage $U_o$ exceeds a limiting value determined by the resistor R7. After charge of capacitor C12 to the upper hysteresis threshold level at the input to the first trigger STc transistor $T_Q$ remains blocked until the excess $U_o$ voltage situation has terminated. This is independent of the initial oscillation of the second trigger STa which is decoupled by resistor R10 from the input of the third trigger STb.

The resistor R9, in combination with the input capacity of the second trigger STa, functions as a starting generator, ensuring initiation of the first oscillation.

The control circuit for an active harmonic filter is simple to construct and reliable. A threshold switch, a reliable and simple component, preferably a Schmitt trigger, is used. In accordance with a preferred feature of the invention, three cascaded but independent Schmitt triggers are used. They can be integrated in a single, integrated circuit (IC) element.

The control circuit can be used not only for step-up circuits, but also for step-down circuits, and generally for all switching-regulator power supplies with sinusoidal network current input including flyback converters, forward converters or full bridge converters.

Various changes and modifications may be made within the scope of the inventive concept.

A power supply, for use with a 50 Hz or 60 Hz, 100-130 V, power network and to supply filtered direct current power of about 85 W at terminals L1, L2 to a fluorescent or HID lamp may have the following characteristics and use these components:

capacitor $C_E$: 0.15 μF/250 V
capacitor C7: 0.15 μF/400 V
capacitor $C_L$: 22 μF/385 V
capacitor C10: 47 nF/400 V
capacitor C11: 1 μF/63 V
capacitor C12: 470 pF/63 V
capacitor C13: 0.1 μF/63 V
choke $L_S$: 0.7 mH with $I_{saturation} > 3.5$ A
variable resistor R4, maximum resistance 10kΩ
resistor R5: 1.5kΩ/0.3 W
resistor R6: 1.2kΩ
resistor R7: 1.8kΩ
resistor R8: 33kΩ/0.5 W
resistor R9: 4.7 MΩ/0.3 W
resistor R10: 100kΩ/0.3 W
resistor R11: 1.8MΩ/0.3 W
resistor R12: 200kΩ/0.3 W
resistor R13: 150kΩ
resistor R14: 39kΩ/0.3 W
resistor R1: 560kΩ/0.3 W
resistor R2: 270kΩ/0.3 W
resistor R3: 82kΩ/0.3 W
diode D6: TL430 (Texas)
diodes D7, D8, D9, D10, D11, D12, D14, D15: 1N4148
diode D1: 400 V; 1.5 A; trr<300 ns
transistor T2: 25 V; 0.1 A; PNP
transistor $T_Q$: POWER-MOS 400 V; 5 A T0220
triggers STa, STb, STc: ½ of 40106 C-MOS IC

We claim:
1. Regulated a.c.–d.c. rectifier and power supply with sinusoidal network current input and high-power factor having
power input terminals (S1, S2) adapted for connection to a power network supplying input electrical energy at commercial power voltage ($U_N$) and frequency ($f_N$);
power output terminals (L1, L2) supplying d.c. output power at a regulated voltage ($U_o$);
a rectifier (12) connected to receive input electrical energy from the input terminals, rectifying said energy and supplying a rectified pulsating d.c. output; having a pulsating d.c. output voltage ($U_E$);
an inductance($L_S$) connected between the d.c. output of the rectifier and the output terminals (L1, L2);
a power storage capacitor ($C_L$) connected across the output terminals (L1, L2);
a diode (d1) connected between the inductance and the power storage capacitor to prevent discharge of the capacitor through the inductance;
a controlled electronic switch ($T_Q$) coupled to the inductance ($L_S$) and affecting current flow ($i_L$) through the inductance; and
a control circuit (16) controlling conduction of the electronic switch ($T_Q$) in dependence on
(a) instantaneous charge state of the inductance represented by an L signal,
(b) instantaneous rectified pulsating d.c. output voltage ($U_E$) delivered by the rectifier represented by a $U_E$ signal, and
(c) instantaneous output voltage ($U_o$) of d.c. power delivered to the d.c. power terminals (L1, L2) and also applied across said power storage capacitor ($C_L$), represented by a $U_o$ signal
wherein, in accordance with the invention
the control circuit (16) comprises
a first threshold switch (STc) connected to and controlling conduction of the elctronic switch ($T_Q$);
a control capacitor (C12) coupled (24, 38) to receive the $U_E$ signal representative of the instantaneous rectified d.c. output voltage ($U_E$) supplied by the rectifier,
further coupled (32, 24) to receive the $U_o$ signal representative of the instantaneous output power voltage ($U_o$), and
further coupled (22, 28; 30, STa, STb) to receive the L signal representative of the charge state of the inductance ($L_S$), said $U_E$ signal, the $U_o$ signal, and the L signal controlling said control capacitor to reverse its charge state and recharge to assume an oppositely charged state, said control capacitor being connected to control the threshold switch (STc) to render the electronic switch (T_Q) conductive for a period of time which corresponds to the time of charge reversal and recharge of the control capacitor (C12) and until the voltage on the control capacitor, upon recharge into the oppositely charged state has reached an upper hysteresis threshold level of the threshold switch (STc), said charge reversal and recharging time being determined by the relative values of said $U_E$ signal representative of the rectified d.c. output voltage ($U_E$) supplied by the rectifier (12), the $U_o$ signal representative of output power voltage ($U_o$) and the time instant when said upper hysteresis threshold level is reached being determined when the L signal representative of the charge state of the inductance ($L_S$) has a characteristic which signifies that the inductance is completely discharged.

2. The power supply of claim 1, wherein said inductance ($L_S$) is connected, in series with said diode (D1) in a connection from one terminal of the rectifier (12) to one of the d.c. output power terminals (L1), said connection defining a first junction (24) between a first terminal of the inductance and one terminal of the rectifier (12);

a second junction (22) between a second terminal of the inductance and a first terminal of the diode (D1) and a third junction (32) defined by the second terminal of the diode (D1), said one power output terminal (L1) and one terminal of said power storage capacitor (CL);

and wherein said controlled electronic switch is connected between the second junction (22) and the second power output terminal (L2,20).

3. The power supply of claim 1, including a wave flank recognition RC circuit (R8,C10) connected to said second junction (22) between the inductance ($L_S$) and said diode (D1) and generating a voltage pulse signal upon sensing a wave flank at said junction upon complete discharge of the inductance ($L_S$);

and circuit means (STa,STb) connecting said voltage pulse signal to the first threshold switch (STc) to control said first threshold switch for, in turn, controlling the electronic switch (T_Q) to change its conduction state.

4. The power supply of claim 3, wherein said circuit means comprises a second threshold switch (STa) coupled to said control capacitor (C12) to discharge the control capacitor (C12) and cause charge reversal and recharging of the control capacitor and hence change-of-state of the first threshold switch (STc).

5. The power supply of claim 4, further comprising two clamping diodes (D7, D8) and a source of reference potential ($U_{DD}$) connected to said clamping diodes, said clamping diodes being serially connected and defining a common junction, said common junction being coupled to an input of the second threshold switch (STa);

and wherein the L signal representative of the charge state of the inductance ($L_S$) is applied to said common junction and through said common junction to the input of said second threshold switch (STa), said diodes (D7, D8) protecting the input to said second threshold switch (STa) against overload condition.

6. The power supply of claim 2, further including a source of reference potential ($U_{DD}$);

and a diode (D10) connected to the source of reference potential and to an input of the first threshold switch (STc) to protect the input of the first threshold switch against over-voltage conditions.

7. The power supply of claim 4, further including a third threshold switch (STb) serially connected between said second and third threshold switches (STa,STc).

8. The power supply of claim 7, wherein said first, second and third threshold switches (STa,STb,STc) comprise Schmitt trigger circuits.

9. The power supply of claim 7, wherein the first, second and third threshold switches (STc,STa,STb) are constructed as a single, integrated circuit.

10. The power supply of claim 2, including a summing circuit providing a summed current to said control capacitor (C12) to determine the charge reversal and recharge time of the control capacitor (C12) and hence the ON connection time of the electronic switch (T_Q), said summing circuit summing currents ($i_{R11}$, $i_{R12}$, $i_{D10}$), the level of which currents is determined by the level of a reference voltage ($U_{DD}$), the instantaneous value of the rectified output voltage ($U_E$) from the rectifier (12) and the instantaneous value of the power output voltage ($U_o$) across the power output terminals (L1,L2).

11. The power supply of claim 4, further including a resistor (R9) bridging the input to an output of said second threshold switch (STa) to function as a start-up generator.

12. The power supply of claim 2, further including an over-voltage protective circuit (D6,R6,R7) coupled to the third junction (32) and transmitting said signal representative of power output voltage ($U_o$) to the first threshold circuit (STc), said over-voltage protective switch deactivating the first threshold switch, upon exceeding a predetermined preset $U_o$ voltage value, until said $U_o$ voltage has dropped below said preset value.

13. The power supply of claim 12, wherein the over-voltage protective circuit includes a controlled Zener diode (D6) and a voltage divider (R6,R7), the voltage divider defining a tap or junction point;

and a coupling diode (D9) coupling the tap or junction point to an input of the third threshold switch (STb).

14. The power supply of claim 2, further including a variable resistor (R4) connected between the third junction (32) and the control capacitor (C12) to control or adjust a preset power output voltage ($U_o$).

15. The power supply of claim 2, further including a R-C filter network (R1,R2,C8,R3,C11) connected to the third junction (32) and providing said signal representative of power output voltage ($U_o$), to filter said power output voltage signal before being applied to said control capacitor (C12).

16. The power supply of claim 1, further comprising a bridging capacitor (C7) connected across the series connected inductance ($L_S$), the second junction (22) and said diode (D1) from the first junction (24) to the third junction (32).

17. The power supply of claim 3, further including a diode network (D11, D12) and coupling the $U_o$ signal representative of power output voltage ($U_o$) to the control capacitor (C12) at a predetermined exact timing instant.

18. The power supply of claim 12, further including a spurious oscillation suppressing capacitor (C13) coupled across the terminals of the Zener diode (D6).

19. The power supply of claim 16, further including a coupling resistor (R14) connected to the first junction (24) and hence to the bridging capacitor (C7) and providing a portion of the summed current ($i_{R12}$) for initiation of circuit operation and hence for starting the power supply.

20. The power supply of claim 16, further including an external control circuit comprising a series circuit formed by a diode (D15) and a resistor (R15), said external control circuit being connected to a junction between the control capacitor (C12) and an input of the first threshold circuit (STc).

21. The power supply of claim 16, further including an external OFF circuit connection, coupled (D14) to the input of the first threshold circuit (STc) for external deactivation of the power supply.

* * * * *